US010699102B2

(12) United States Patent
Nakano et al.

(10) Patent No.: US 10,699,102 B2
(45) Date of Patent: Jun. 30, 2020

(54) IMAGE IDENTIFICATION APPARATUS AND IMAGE IDENTIFICATION METHOD

(71) Applicant: CANON KABUSHIKI KAISHA, Tokyo (JP)

(72) Inventors: Shunsuke Nakano, Kawasaki (JP); Hiroshi Sato, Kawasaki (JP); Yuji Kaneda, Kawasaki (JP); Atsuo Nomoto, Tokyo (JP); Daisuke Nishino, Kawasaki (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 15/362,612

(22) Filed: Nov. 28, 2016

(65) Prior Publication Data
US 2017/0154209 A1 Jun. 1, 2017

(30) Foreign Application Priority Data

Dec. 1, 2015 (JP) ................................ 2015-235022

(51) Int. Cl.
*G06K 9/00* (2006.01)
*G06K 9/46* (2006.01)
*G06K 9/62* (2006.01)
*G06K 9/66* (2006.01)

(52) U.S. Cl.
CPC ..... *G06K 9/00288* (2013.01); *G06K 9/00255* (2013.01); *G06K 9/4628* (2013.01); *G06K 9/628* (2013.01); *G06K 9/6269* (2013.01); *G06K 9/6286* (2013.01); *G06K 9/66* (2013.01); *G06K 2009/00322* (2013.01)

(58) Field of Classification Search
CPC ............. G06K 9/00288; G06K 9/4628; G06K 9/00255; G06K 9/6286; G06K 9/628; G06K 9/6269; G06K 9/66; G06K 2009/00322
See application file for complete search history.

(56) References Cited

U.S. PATENT DOCUMENTS 9,679,195 B2 * 6/2017 Xiong ................ G06K 9/00288

FOREIGN PATENT DOCUMENTS

| JP | 2006343791 A | 12/2006 |
| JP | 2009502230 A | 1/2009 |
| JP | 2015185149 A | 10/2015 |

OTHER PUBLICATIONS

Kumar, Neeraj, et al. "Attribute and simile classifiers for face verification." Computer Vision, 2009 IEEE 12th International Conference on. IEEE, 2009.*
Golomb, B., and T. Sejnowski. "Sex recognition from faces using neural networks." Applications of neural networks. Springer, Boston, MA, 1995. 71-92.*

(Continued)

Primary Examiner — Menatoallah Youssef
(74) Attorney, Agent, or Firm — Canon U.S.A., Inc. IP Division

(57) ABSTRACT

An identification apparatus includes an acquisition unit configured to acquire input data and an identification unit configured to identify a class to which the acquired input data belongs based on a classifier configured to identify a class to which the data belongs from among a plurality of classes that includes two or more classes having been set beforehand.

11 Claims, 12 Drawing Sheets

(56) References Cited

OTHER PUBLICATIONS

Kumar, Neeraj, et al. "Attribute and simile classifiers for face verification." Computer Vision, 2009 IEEE 12th International Conference on. IEEE, 2009. (Year: 2009).*
Golomb, B., and T. Sejnowski. "Sex recognition from faces using neural networks." Applications of neural networks. Springer, Boston, MA, 1995. 71-92. (Year: 1995).*
Zhang, et al., "Face Recognition Across Pose: a Review", Computer Vision and Image Processing Lab, Institute for Integrated and Intelligent Systems, Griffith University, Australia, 2009.
Ahonen, et al., "Face recognition with local binary patterns", Machine Vision Group, Infotech Oulu PO Box 4500, FIN-90014 University of Oulu, Finland, ECCV 2004, LNCS 3021, pp. 469-481, 2004.
Kumar, et al., "Attribute and Simile Classifiers for Face Verification", Columbia University, 2009.
Berg, et al., "Tom-vs-Pete Classifiers and Identity-Preserving Alignment for Face Verification", 2012.
Taigman, et al., "DeepFace: Closing the Gap to Human-Level Performance in Face Verification", Facebook AI Research, 2014.
Sun, et al., "Deeply Learned Face Representations are Sparse, Selective, and Robust", 2014.
Boser, et al., "A training algorithm for optimal margin classifiers", 1992.
Krizhevsky, et al., "ImageNet Classification with Deep Convolutional Neural Networks", 2012.

* cited by examiner

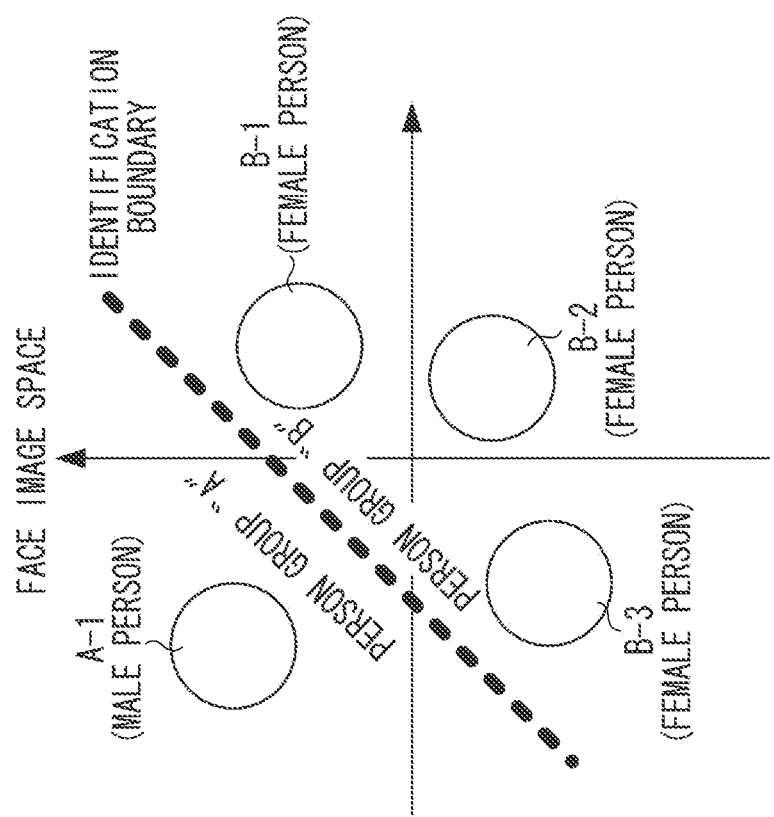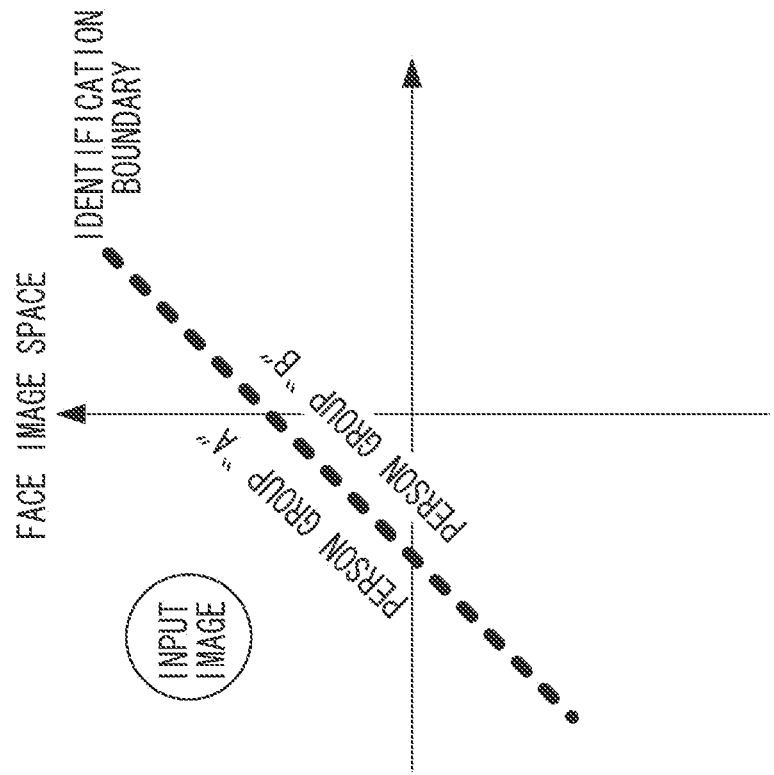

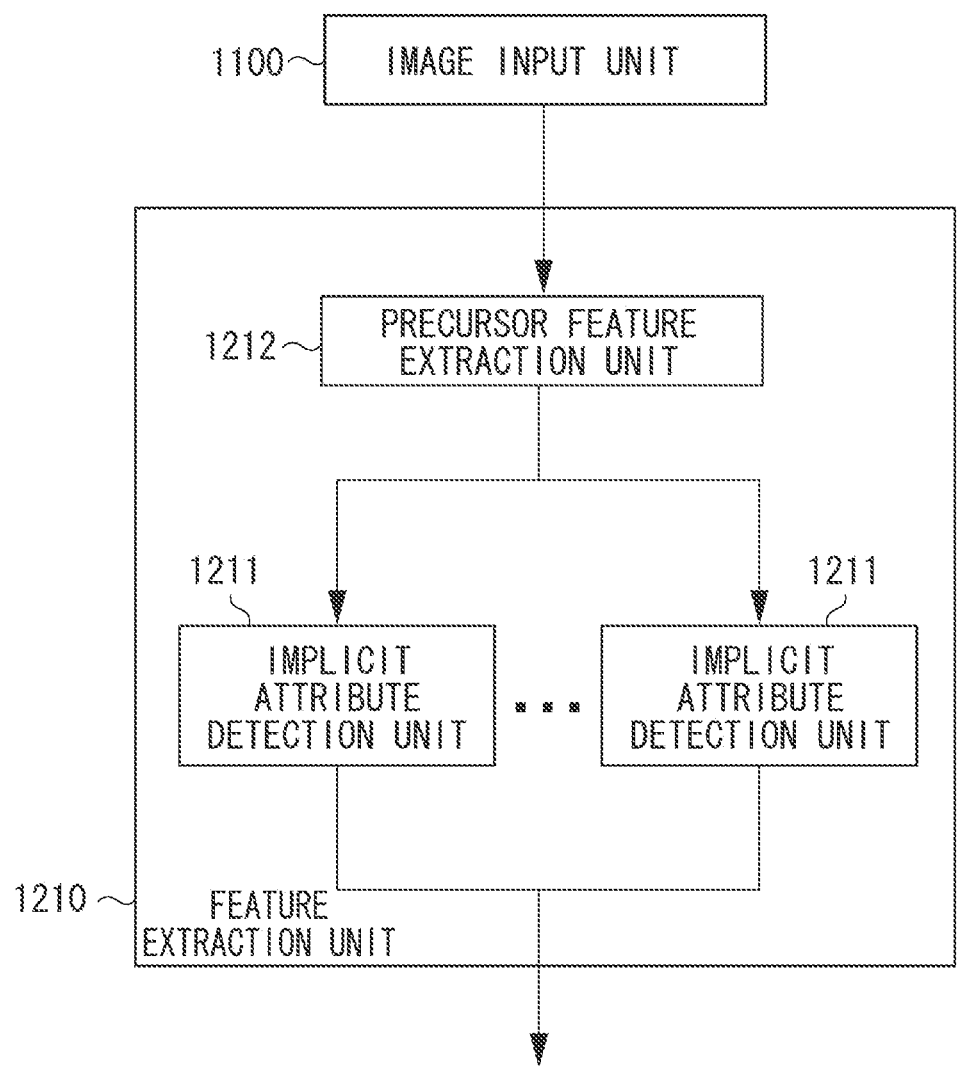

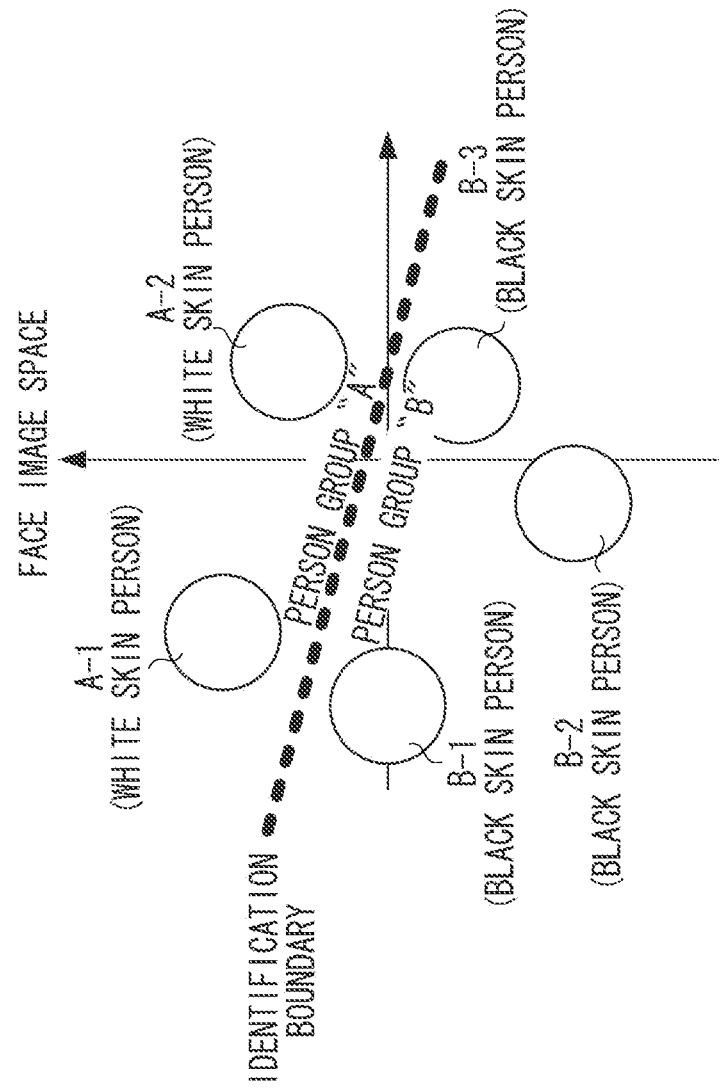

IMAGE IDENTIFICATION APPARATUS AND IMAGE IDENTIFICATION METHOD

BACKGROUND OF THE INVENTION

Field of the Invention

The present invention relates to an image identification apparatus and an image identification method.

Description of the Related Art

There are many techniques proposed to extract useful information through advanced processing applied to an object image included in captured image data. One of these techniques is referred to as "face recognition", which is characterized by recognizing a human face image and detecting attributes of a face. For example, gender estimation to estimate the gender of a person from a recognized face, age estimation to estimate the age of a person from a recognized face, and face identification to identify whether two face images belong to the same person are typical examples of the face recognition technique.

As discussed in Face Recognition Across Pose-Review: X. Zhang, Y Gao: 2009, an issue may arise in the face identification because a visually recognizable change of a face image of the same person is so great that the person cannot be identified if the imaging direction or the illumination angle is changed. The techniques intended to solve the above-mentioned issue are roughly classified into two categories.

A first technique is characterized by performing conversion in such a way as to extract only visually recognizable features that can be used in identifying an individual person from a face image. The face identification based on the first technique includes comparing visually recognizable features extracted from two face images. For example, such an image conversion technique is discussed in Face recognition with local binary patterns: T Ahonen, A Hadid, M Pietikainen: 2004.

A second technique is characterized by extracting and comparing higher-order features representing face attributes (e.g., gender, eye color, and skin color) from face images, instead of directly comparing visually recognizable features of respective faces. The face identification based on the second technique includes regarding a plurality of detected attribute values as a vector and comparing vectors respectively detected from two face images. As discussed in Attribute and Simile Classifiers for Face Verification: Neeraj Kumar, Alexander C. Berg, Peter N. Belhumeur, and Shree K. Nayar: 2009, manually designing attributes to be explicitly detected and machine learning respective attribute detectors beforehand is an example of the second technique.

However, to perform the machine learning processing on the attribute detectors, the techniques discussed in the above-mentioned literature require collecting a sufficient number of face images each being accompanied by a label indicating inclusion of an attribute to be detected. In this respect, the above-mentioned techniques are time-consuming. Further, the design of an attribute to be detected may have an adverse influence on the accuracy of the face identification. Therefore, as discussed in the above-mentioned literature, the technique capable of implicitly designing an attribute to be detected through the machine learning is highly accurate.

The above-mentioned technique obtains the attribute detectors by machine learning one-vs-rest type numerous person classifiers, which can identify whether a face image represents a specific person, instead of explicitly performing machine learning processing on the attribute detectors. For example, a classifier for a specific person with blue eyes can be construed as a person classifier that can work as an attribute detector capable of implicitly identifying the presence of blue eyes. The above-mentioned technique includes training a plurality of person classifiers for various persons prepared beforehand and performing face identification based on a feature vector constituted by attribute detection values (i.e., outputs of respective classifiers).

Further, as discussed in Tom-vs-Pete Classifiers and Identity-Preserving Alignment for Face Verification: Thomas Berg and Peter N. Belhumeur: 2012, there is a conventional method for machine learning a one-vs-one type person classifier that can identify one of two specific persons, not the person classifier capable of identifying a specific person. For example, if one of the specific persons is a person with a high nose and the other is a person with a low nose, it can be construed that the person classifier works as an attribute detector capable of implicitly identifying the height of each nose. According to the above-mentioned technique, it is feasible to prepare an implicit attribute detector based on a combination of two persons. Therefore, greatly improving the accuracy is feasible by using numerous implicit attribute detectors, compared to the technique discussed in the thesis of Kumar et al.

On the other hand, Deep Learning technique is a recently proposed technique, which is characterized by using a multi-layered neural networks to perform machine learning processing on classifiers. Compared to the conventional machine learning technique, the Deep Learning technique can attain high accuracy because machine learning a nonlinear classifier having numerous adjustable parameters can be realized by using a great amount of data incomparable to other conventional machine learning techniques. As discussed in DeepFace: Closing the Gap to Human-Level Performance in Face Verification: Yaniv Taigman, Ming Yang, Marc'Aurelio Ranzato, Lior Wolf: 2014 and Deeply Learned Face Representations are Sparse, Selective, and Robust: Yi Sun, Xiaogang Wang, and Xiaoou Tang: 2014, there is a report of learning results according to the Deep Learning technique, in which the implicit one-vs-rest type attribute detectors discussed in the thesis of Kumar et al. are used in the face identification for several thousands of people.

It has been concluded that the implicit one-vs-one type attribute detector discussed in the thesis of Berg et al. is highly accurate compared to the implicit one-vs-rest type attribute detector discussed in the thesis of Kumar et al. Therefore, it can be expected that training the implicit one-vs-one type attribute detector according to, for example, the Deep Learning technique can train classifiers that are highly accurate compared to the one-vs-rest type classifiers discussed in the thesis of Taigman et al. and the thesis of Sun et al. However, although a great amount of learning data is required to obtain a highly accurate classifier, there is a constraint that only the learning data of two specific persons is usable in machine learning the implicit one-vs-one type attribute detector. Therefore, there is an issue that a sufficient amount of data for the machine learning cannot be obtained. According to the conventional methods, it is unfeasible to sufficiently train the implicit one-vs-one type attribute detector and therefore the accuracy of the classifier cannot be improved.

SUMMARY OF THE INVENTION

According to an aspect of the present invention, an identification apparatus includes an acquisition unit configured to acquire input data, and an identification unit configured to identify a class to which the acquired input data belongs based on a classifier configured to identify which class the input data belongs to among a plurality of classes that includes two or more classes having been set beforehand.

Further features of the present invention will become apparent from the following description of exemplary embodiments with reference to the attached drawings.

BRIEF DESCRIPTION OF THE DRAWINGS

FIGS. 6A, 6B, 6C, and 6D illustrate identification processing performed by an implicit attribute detection unit.

FIG. 7 is a block diagram illustrating an example of a detailed configuration of the feature extraction unit.

FIGS. 8A, 8B, and 8C illustrate an example of identification processing performed by the implicit attribute detection unit.

DESCRIPTION OF THE EMBODIMENTS

Hereinbelow, exemplary embodiments of the present disclosure will be described in detail below with reference to attached drawings.

In a first exemplary embodiment, the processing target is a human face. Processing according to the present exemplary embodiment is applicable to face identification identifying a difference between two or more persons based on a face image, as described in detail below. In the present exemplary embodiment, it is assumed that one face image includes a face portion of only one person. However, in a case where a captured image includes a plurality of face portions, it is assumed that pre-processing is performed beforehand by using a conventionally known face detection technique to detect each face and the processing according to the present exemplary embodiment is performed repetitively for respective detected face portions.

<Hardware Configuration of Object Identification Apparatus>

Figure 1:
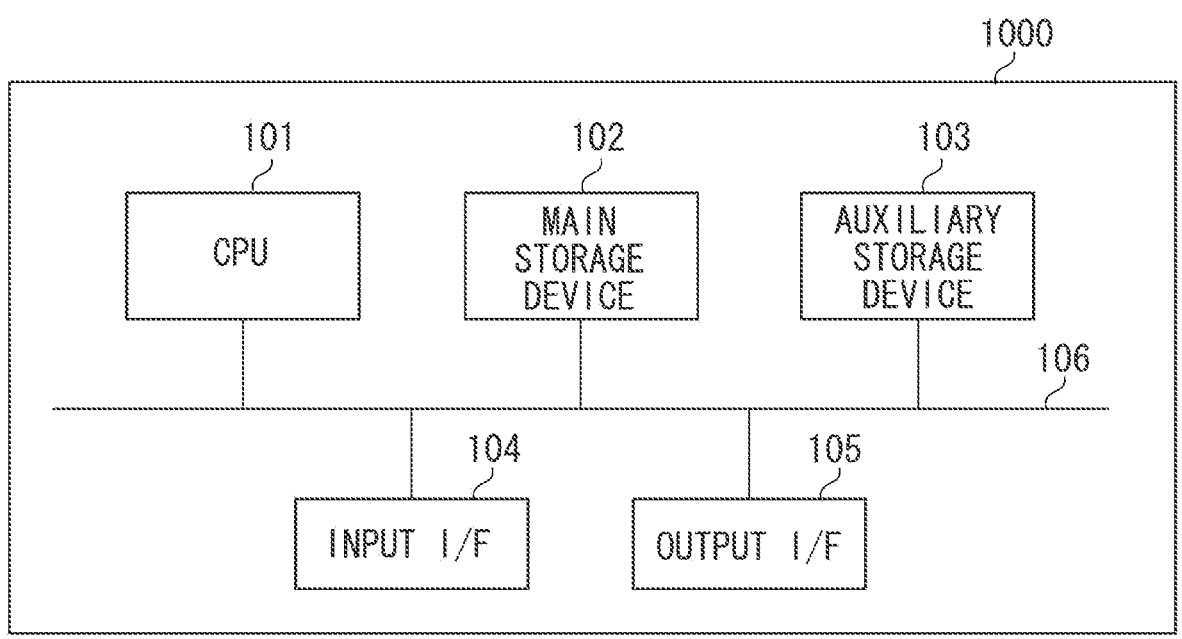
FIG. 1 is a block diagram illustrating an example of a hardware configuration of an object identification apparatus.

FIG. 1 illustrates an example of a hardware configuration of an object identification apparatus 1000. The object identification apparatus 1000 includes a central processing unit (CPU) 101, a main storage device 102, an auxiliary storage device 103, an input I/F 104, and an output I/F 105. The CPU 101, the main storage device 102, the auxiliary storage device 103, the input I/F 104, and the output I/F 105 are mutually connected via a system bus 106. The object identification apparatus 1000 is constituted by an information processing apparatus, such as a computer. The object identification apparatus 1000 is an example of an identification apparatus that can identify a class to which input data belongs.

The CPU 101 is a central processing apparatus that can control processing to be performed by the object identification apparatus 1000. The main storage device 102 is functionally operable as a work area for the CPU 101 or a storage area storing various data. The auxiliary storage device 103 can store various programs, various threshold values, and various setting values. The input I/F 104 is an interface via which image information can be input from an external imaging apparatus. The output I/F 105 is an interface via which image information can be output to an external display apparatus.

The CPU 101 performs processing according to the programs stored in the auxiliary storage device 103 to realize various functions of the object identification apparatus 1000 described below with reference to FIGS. 2, 4, 5, 7, and 10 and processing of a flowchart illustrated in FIG. 3.

<Functional Configuration of Object Identification Apparatus>

Figure 2:
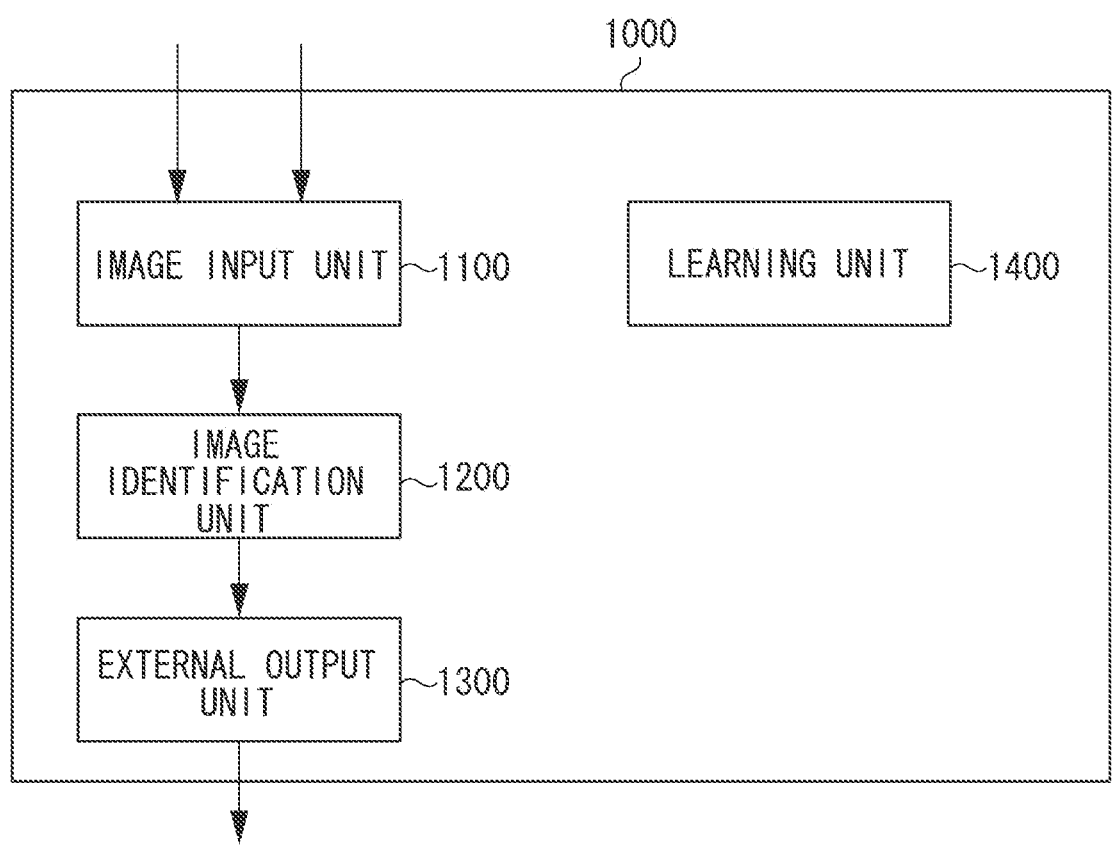
FIG. 2 is a block diagram illustrating an example of a functional configuration of the object identification apparatus.

FIG. 2 illustrates an example of a functional configuration of the object identification apparatus 1000. The object identification apparatus 1000 includes an image input unit 1100 and an image identification unit 1200. The image input unit 1100 is configured to acquire two face images, as input data to be checked by image identification unit 1200. The image identification unit 1200 is configured to identify whether the two face images acquired by the image input unit 1100 include the same person. Further, the object identification apparatus 1000 includes an external output unit 1300 and a learning unit 1400. The external output unit 1300 is configured to output an identification result obtained by the image identification unit 1200. The learning unit 1400 is configured to perform machine learning processing on target classifiers.

The image input unit 1100 acquires face images, as input data, from an imaging apparatus equipped with an optical lens and an image sensor, which is an apparatus that supplies image data to be used in identifying whether compared persons are the same. Further, the image input unit 1100 may be configured to acquire input data from the auxiliary storage device 103 or from an external semiconductor memory that stores image data.

The image identification unit 1200 can identify whether two face images acquired by the image input unit 1100 include the same person. The image identification unit 1200 will be described in detail below with reference to FIG. 4. To realize the functions of the image identification unit 1200, the CPU 101 executes related programs stored in the auxiliary storage device 103. However, the functions of the image identification unit 1200 can be realized by a dedicated circuit (ASIC) or a processor (e.g., a reconfigurable processor, DSP, or CPU) on which specific programs run. Further, the functions of the image identification unit 1200 can be realized by a single dedicated circuit or a general-purpose circuit (e.g., CPU for personal computer) on which specific programs run.

The external output unit 1300 can output an output of the image identification unit 1200, i.e., an appropriate identification result with respect to whether two face images acquired by the image input unit 1100 include the same person, to an external device. The external output unit 1300 can display image data (i.e., the input data acquired by the image input unit 1100) on an external liquid crystal monitor. Further, the external output unit 1300 can superimpose the output of the image identification unit 1200 on the displayed image data. Further, the external output unit 1300 can output the displayed data, as electronic data, to an external storage medium or can output the displayed data in a print format to a paper medium. The output format of the external output unit 1300 is not limited to the above-mentioned example, and for example, console output and email are available to transmit appropriate data representing the processing result of the image identification unit 1200 to a specific address. Further, the external output unit 1300 can output the processing result of the image identification unit 1200 in a plurality of output formats.

The learning unit 1400 can perform machine learning processing on each classifier to be used by the image identification unit 1200 based on learning data stored in the auxiliary storage device 103. For example, the learning unit 1400 performs machine learning processing on each classifier by adjusting a parameter of the classifier in such a way as to identify correct solution data included in the learning data as a correct solution and identify data other than the correct solution data as an incorrect solution. Further, for example, the learning unit 1400 performs machine learning processing on two classifiers of "class A" and "class B" in the following manner. More specifically, the learning unit 1400 performs machine learning processing on each classifier by adjusting the parameter of the classifier in such a way as to identify "class A" data included in the learning data as belonging to the "class A" and identify "class B" data included in the learning data as belonging to the "class B". The object identification apparatus 1000 including the learning unit 1400 is an example of an adjustment apparatus that performs machine learning processing on each classifier by adjusting a parameter of the classifier.

In the present exemplary embodiment, the object identification apparatus 1000 includes the learning unit 1400. The learning unit 1400 performs machine learning processing on classifiers. The object identification apparatus 1000 performs identification processing based on the machine-learned classifiers. Alternatively, the object identification apparatus 1000 may be configured to perform identification processing based on classifiers having been subjected to machine learning processing performed by an external apparatus (including no learning unit 1400).

Figure 3:
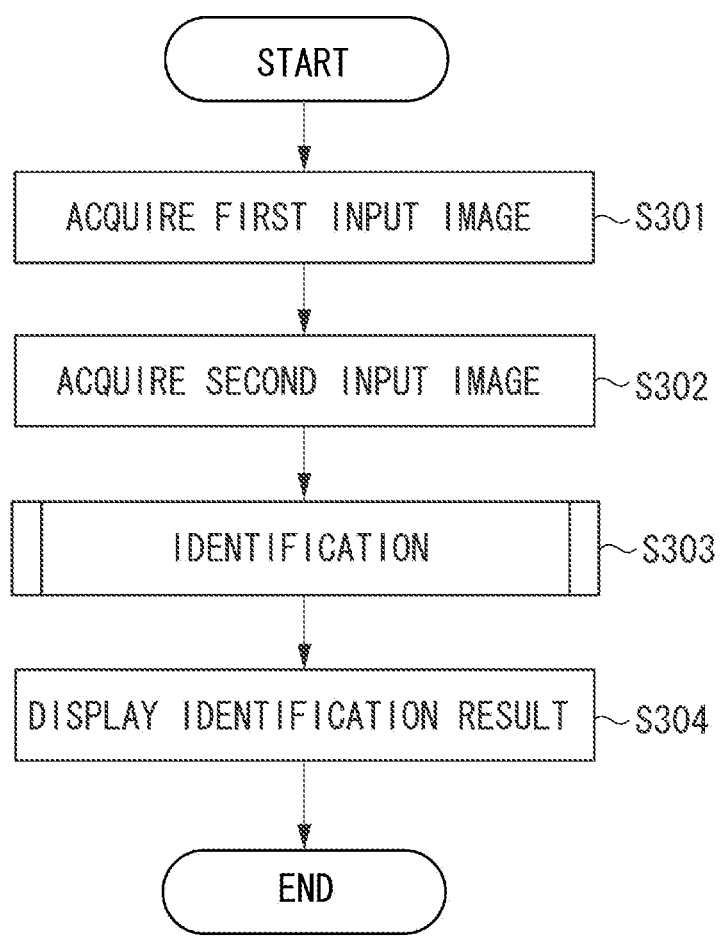
FIG. 3 is a flowchart illustrating an example of processing that can be performed by the object identification apparatus.

FIG. 3 is a flowchart illustrating an example of processing that can be performed by the object identification apparatus 1000 according to the present exemplary embodiment. Face image identification processing performed by the object identification apparatus 1000 will be described in detail below with reference to FIG. 3.

In step S301, the image input unit 1100 acquires a face image, as a first input image, from the external imaging apparatus.

In step S302, the image input unit 1100 acquires a face image, i.e., a target to be checked whether the class thereof is identical to that of the face image acquired in step S301, as a second input image, from the external imaging apparatus.

In step S303, the image identification unit 1200 identifies respective face images acquired in steps S301 and S302. The processing to be performed in step S303 will be described in detail below with reference to FIGS. 4 to 10.

In step S304, the external output unit 1300 outputs a result of the identification processing performed in step S303.

<Identification Processing: Outline>

Figure 4:
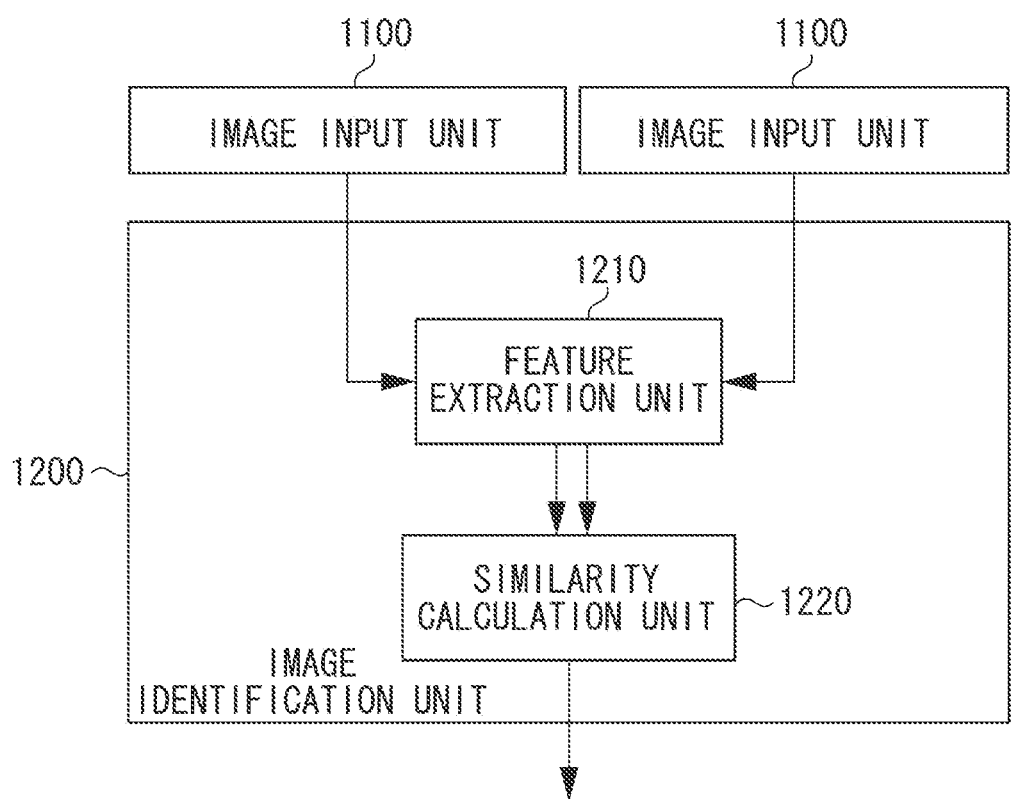
FIG. 4 is a block diagram illustrating an example of a detailed configuration of an image identification unit.

The processing to be performed in step S303 illustrated in FIG. 3 will be described in detail below. FIG. 4 illustrates a detailed configuration of the image identification unit 1200.

The image identification unit 1200 includes a feature extraction unit 1210 and a similarity calculation unit 1220.

First, the feature extraction unit 1210 acquires input images, i.e., two face images to be identified, from different image input units 1100. The feature extraction unit 1210 extracts feature quantities that can be used to identify an individual person from the acquired input images.

The similarity calculation unit 1220 compares the feature quantities of the two input images extracted by the feature extraction unit 1210 and calculates a degree of similarity between the feature quantities of the two input images. The image identification unit 1200 compares the degree of similarity calculated by the similarity calculation unit 1220 with a predetermined threshold value. If the degree of similarity is greater than the threshold value, the image identification unit 1200 determines that the two input face images include the same person. Further, if the degree of similarity calculated by the similarity calculation unit 1220 is equal to or less than the threshold value, the image identification unit 1200 determines that the two input face images do not include the same person.

A setting file including the predetermined threshold value is stored beforehand in the auxiliary storage device 103. The similarity calculation unit 1220 can change the predetermined threshold value of the setting file stored in the auxiliary storage device 103 in response to a user operation via an input device of the object identification apparatus 1000. It is assumed that the predetermined threshold value is already adjusted according to a user's request. If the predetermined threshold value becomes lower, there will be a higher possibility that the image identification unit 1200 can surely identify a target person included in the input image and, at the same time, the possibility of erroneously identifying another person as the target person will increase. To the contrary, if the predetermined threshold value becomes higher, there will be a lower possibility that the image identification unit 1200 may erroneously identify another person as the target person. However, there will be a higher possibility that the target person cannot be correctly identified in the input image.

<Identification Processing: Details of Feature Extraction Processing>

Figure 5:
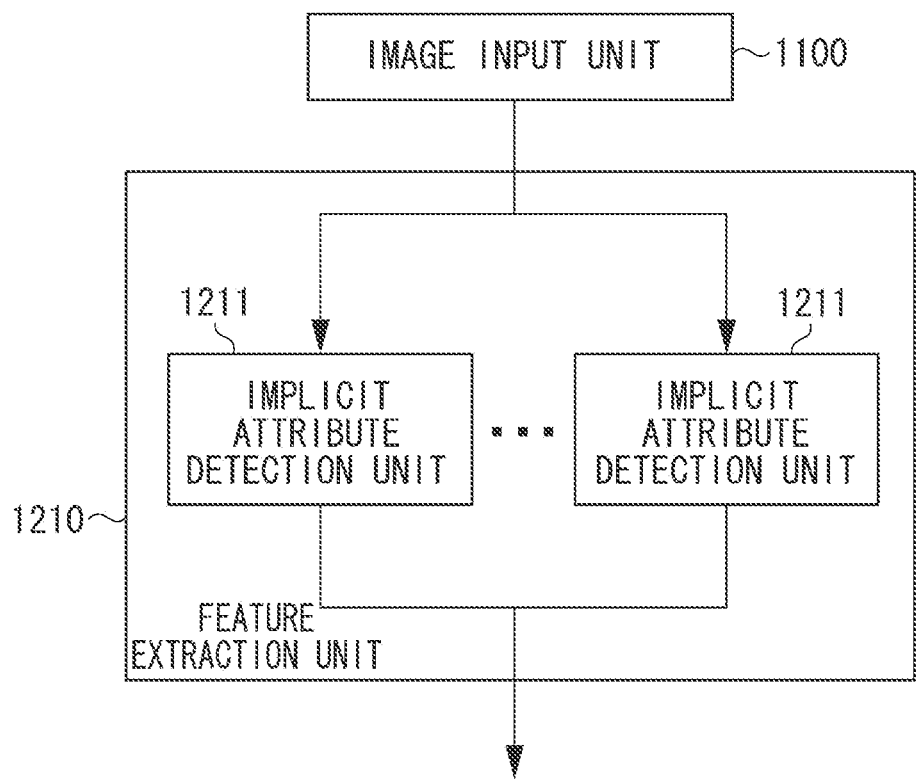
FIG. 5 is a block diagram illustrating an example of a detailed configuration of a feature extraction unit.

Processing to be performed by the feature extraction unit 1210 will be described in detail below. The feature extraction unit 1210 extracts feature quantities to be required in identifying an individual person from the input images acquired by the image input unit 1100. FIG. 5 illustrates an example of a detailed configuration of the feature extraction unit 1210. The feature extraction unit 1210 includes a plurality of implicit attribute detection units 1211.

Each implicit attribute detection unit 1211 can acquire two input images from the image input unit 1100. The feature extraction unit 1210 integrates detection results obtained by respective implicit attribute detection units 1211. More specifically, the feature extraction unit 1210 generates a single vector by connecting output values representing the class identification results of respective input images, which have been obtained from respective implicit attribute detection units 1211. Details of the implicit attribute detection units 1211 will be described below with reference to FIGS. 6A, 6B, 6C, and 6D. Respective implicit attribute detection units 1211 detect attributes of mutually different faces. Therefore, the vector constituted as a connection of the output values obtained from respective implicit attribute detection units 1211 is complementary information generated by gathering numerous attribute values of different faces, and can serve as a feature quantity that is usable to identify an individual person.

In the present exemplary embodiment, the feature extraction unit 1210 directly transmits the input images acquired from the image input unit 1100 to the implicit attribute detection units 1211. Alternatively, the feature extraction unit 1210 may be configured to perform the following processing. For example, the feature extraction unit 1210 may be configured to perform the feature extraction processing discussed in the above-mentioned thesis of Ahonen et al. and input the extracted feature quantities to the implicit attribute detection units 1211. Performing the above-mentioned pre-processing on the images to be input to the implicit attribute detection units 1211 is useful to improve the accuracy of the identification processing. Further, the feature extraction unit 1210 may divide the input image acquired from the image input unit 1100 into a plurality of portions and may input each divided portion to a corresponding implicit attribute detection unit 1211.

<Identification Processing: Details of Implicit Attribute Detection Processing>

Figure 6D:
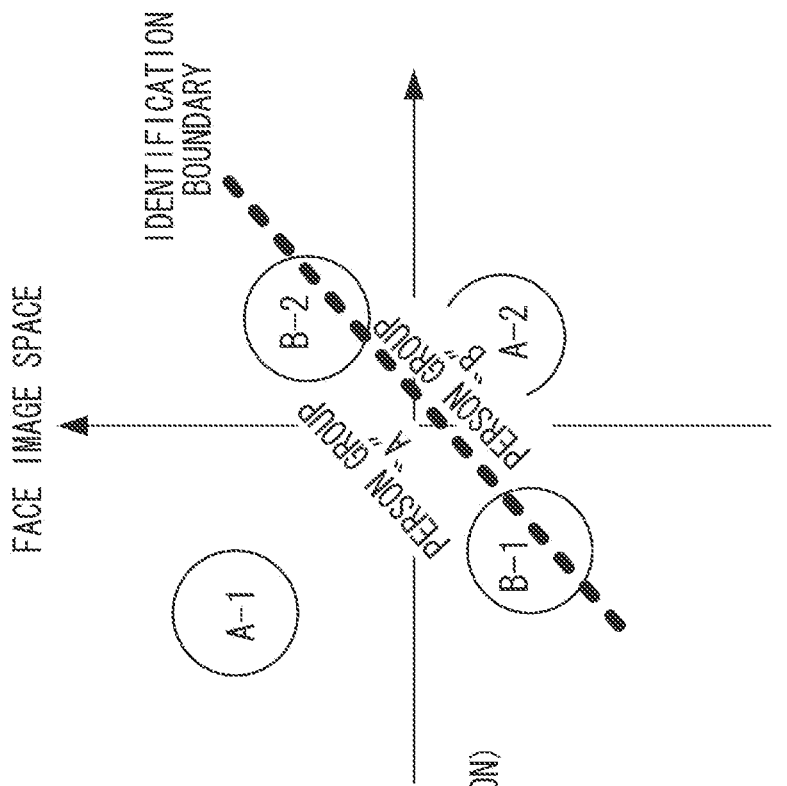

The implicit attribute detection units 1211 illustrated in FIG. 5 will be described in detail with reference to FIGS. 6A, 6B, 6C, and 6D. FIGS. 6A, 6B, 6C, and 6D illustrate the identification processing to be performed by the implicit attribute detection units 1211. The implicit attribute detection units 1211 are classifiers that can identify one of two classes to which a face included in the input image belongs. FIG. 6A schematically illustrates person groups to be identified by the implicit attribute detection unit 1211. FIG. 6A illustrates a person group "A" and a person group "B" that are positioned at both sides of an identification boundary and indicates that the input image belongs to the person group "A". Two-class identification processing is generally performed in such a way as to determine whether identification target data belongs to an intended class or belongs to the other class.

The conventionally used one-vs-one type classifier can identify whether input data includes an intended person or other than the intended person. The one-vs-one type classifier can identify whether identification target data belongs to a specific class or belongs to another specific class. In face identification processing, the one-vs-one type classifier identifies whether identification target face image data represents a specific person or another specific person. However, the implicit attribute detection unit 1211 according to the present exemplary embodiment is an improved type of the one-vs-one type classifier, which is characterized by an extended "One", and is a classifier that can identify whether the input data belongs to the person group "A" including a specific person or belongs to the person group "B" not including the specific person. More specifically, the two-class identification processing to be performed by the implicit attribute detection unit 1211 according to the present exemplary embodiment is processing for identifying whether the identification target data belongs to the person group "A" having been set or belongs to the person group "B" that is different from the person group "A".

Figure 6C:
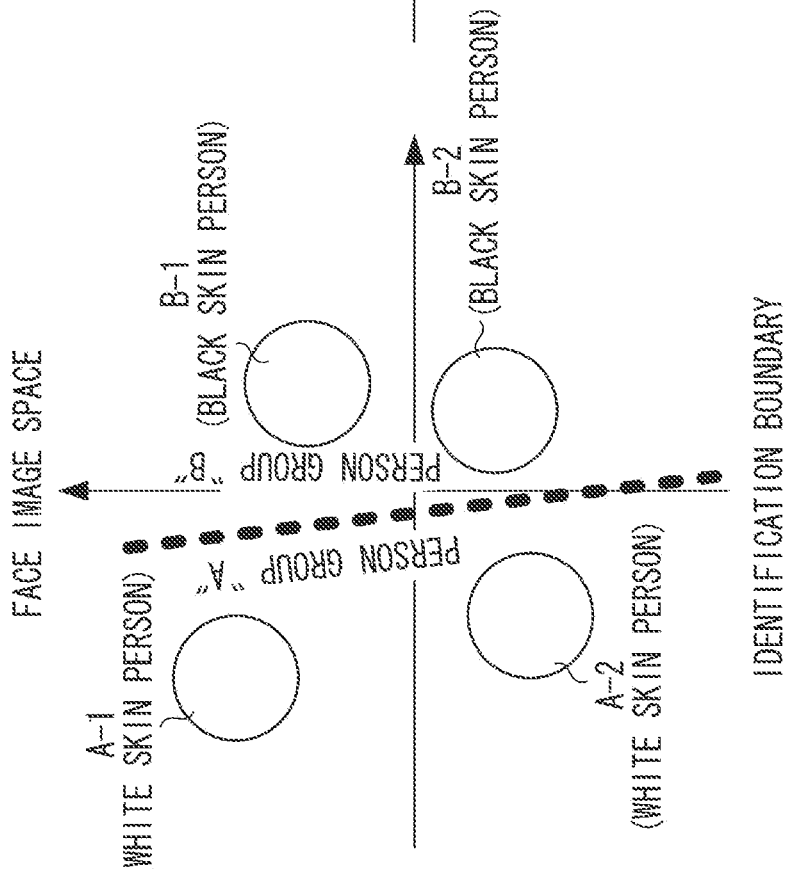

The identification boundary illustrated in FIG. 6A can be obtained through machine learning processing applied to face images of a person group prepared beforehand. In the example illustrated in FIG. 6A, the meaning of the identification processing performed by the implicit attribute detection unit 1211 can be construed in the following manner. For example, as illustrated in FIG. 6B, it is assumed that all persons belonging to the person group "A" prepared beforehand are male and all persons belonging to the person group "B" are female. In this case, the identification boundary can be construed in the following manner. More specifically, the identification boundary can be directly used to identify the person group to which the input image belongs and, at the same time, can be implicitly construed as a classifier capable of identifying a gender-related attribute value. As another example, as illustrated in FIG. 6C, if it is assumed that all persons belonging to the person group "A" are white skin persons and all persons belonging to the person group "B" are black skin persons, the identification boundary can be implicitly construed as a classifier capable of identifying a skin color-related attribute value. The attributes illustrated in FIGS. 6A, 6B, 6C, and 6D are simplified examples that can be understood by humans and can be expressed by languages. However, the attributes may be any other examples that cannot be understand by humans or cannot be expressed by languages. For example, subtle shapes of eyes, noses, and face contours are examples of the attributes that can be used to identify an individual person although these features cannot be expressed by languages. The implicit attribute detection unit 1211 may be configured to identify the above-mentioned attributes.

The processing and implementation of the implicit attribute detection unit 1211 will be described in detail below, together with the learning processing. The parameters to be used in the processing of the implicit attribute detection unit 1211, i.e., the identification boundaries illustrated in FIGS. 6A, 6B, 6C, and 6D, can be determined through the machine learning. It is assumed that the parameters of the implicit attribute detection unit 1211 are subjected to the machine learning processing before the object identification apparatus 1000 starts operations. Respective implicit attribute detection units 1211 included in the feature extraction unit 1210 are similar to each other in processing and implementation. However, the parameters of the implicit attribute detection units 1211 are different from each other because the configurations of person groups used in the machine learning are different as illustrated in FIGS. 6B and 6C. Therefore, the plurality of implicit attribute detection units 1211 can implicitly detect mutually different attributes.

<Implicit Attribute Detection Unit Learning Processing>

Machine learning processing to be performed by the implicit attribute detection unit 1211 will be described in detail below. It is assumed that the learning unit 1400 performs machine learning processing on each implicit attribute detection unit 1211 before starting input data identification processing. In the present exemplary embodiment, the object identification apparatus 1000 including the learning unit 1400 can perform machine learning processing for the implicit attribute detection unit 1211 by adjusting the parameter of each implicit attribute detection unit 1211. However, machine learning the implicit attribute detection unit 1211 by adjusting the parameter of each implicit attribute detection unit 1211 can be realized by an adjustment apparatus if it includes a hardware configuration similar to that illustrated in FIG. 1 and includes the learning unit 1400. In this case, the adjustment apparatus transmits information about the machine-learned implicit attribute detection unit 1211 to the object identification apparatus 1000. Then, the object identification apparatus 1000 performs identification processing based on the implicit attribute detection unit 1211 corresponding to the received information. According to the above-mentioned configuration, a CPU of the adjustment apparatus performs processing based on a program stored in a main storage device of the adjustment apparatus in such a way as to realize the functions of the adjustment apparatus.

The learning unit 1400 acquires learning data to be used in the machine learning from the auxiliary storage device 103 and an external storage device. If the acquired learning data includes personal data relating to a plurality of persons, the learning unit 1400 generates all possible pairs of person groups that can be generated from a plurality of persons. For example, if the number of persons included in the learning data is four, the learning unit 1400 generates a total of 28 pairs of person groups, i.e., six pairs each being composed of only one person, 12 pairs each being composed of a combination of one person and two persons, four pairs each being composed of one person and three persons, six pairs each being composed of two persons and two persons. Then, the learning unit 1400 performs machine learning processing for the implicit attribute detection units 1211 corresponding to the generated pairs of person groups. The implicit attribute detection units 1211 corresponding to respective pairs of person groups identify one person group and the other person group of the pair of the person groups. The CPU 101 performs machine learning processing for the implicit attribute detection units 1211 corresponding to respective generated pairs of the person groups based on the learning data.

The implicit attribute detection unit 1211 that identifies a pair of person groups is expected to function as a classifier capable of implicitly detecting a common attribute that each of the persons belonging to the group possesses, for example, as illustrated in FIG. 6B or FIG. 6C. However, there will be a case where there is not any common attribute in a person group if the configuration of the person group is inappropriate, as illustrated in FIG. 6D. In such a case, the learning unit 1400 cannot determine the identification boundary, which is necessary for a person classifier. In this case, the learning unit 1400 will learn a classifier that cannot detect any implicit attribute. Such a classifier does not contribute to face identification. Therefore, the object identification apparatus 1000 can use a conventionally known technique, such as AdaBoost, to select a classifier that can contribute to the face identification as an implicit attribute detector. In the present exemplary embodiment, the class that can be identified by the implicit attribute detection unit 1211 is a person group or an individual person. The implicit attribute detection unit 1211 is an example of a classifier.

The AdaBoost technique is characterized by successively selecting a classifier that is most excellent in identifying a class of given data. The AdaBoost technique can enhance the overall performance when a combination of a plurality of classifiers is used, by increasing a weighting factor of the data that cannot be accurately identified by a selected classifier and subsequently selecting a classifier that is next excellent in identification.

Further, in a case where explicit attributes (e.g., race, gender, age, etc.) of persons included in the learning data are known beforehand, the learning unit 1400 can generate a limited number of pairs of person groups, instead of generating pairs of person groups as many as possible. For example, the learning unit 1400 may generate a person group composed of face images that are similar in explicit attribute, which can be obtained beforehand through clustering. It is desired for the learning unit 1400 that the total number of persons belonging to the same person group is two, three, or four, typically. If the number of persons belonging to the same person group increases, the possibility that there is not any common attribute among the persons belonging to the person group will increase.

The processing and implementation of the implicit attribute detection unit 1211 are arbitrary. For example, the following example is employable. For example, the learning unit 1400 may perform machine learning processing for the implicit attribute detection unit 1211 configured as a linear classifier. The linear classifier can be expressed by the following formula (1), in which "f" represents a vector constituted by pixel values of an input image sequentially arrayed in a row, represents a vector expressing a hyperplane of the identification boundary, and "b" represents a bias.

$$c = af + b \quad (1)$$
$$\begin{cases} f \Rightarrow class1 & c > 0 \\ f \Rightarrow class2 & c < 0 \end{cases}$$

The learning unit 1400 obtains the identification boundary vector and the bias "b" through machine learning. A practical method employable in this case is Support Vector Machine (SVM) discussed, for example, in A training algorithm for optimal margin classifiers: Boser, B. E.; Guyon, I. M.; Vapnik, V. N.: 1992. The SVM technique is an example of a supervised learning method. The SVM technique is characterized by slightly permitting a classification error of learning data that cannot be linearly separated, as a constraint condition in obtaining the identification boundary, and obtaining a remote identification boundary as far as possible based on the remaining learning data.

Further, the learning unit 1400 may perform machine learning processing for the implicit attribute detection unit 1211 configured as a convolutional neural network (CNN). The CNN is a nonlinear image converter that can gradually contract image information by linking a result obtainable through a convolution arithmetic operation applied to an image with another convolution arithmetic operation additionally performed on the obtained result. A recent CNN having a deep hierarchical configuration is referred to as "DeepNet", which can attain high accuracy, as discussed in ImageNet Classification with Deep Convolutional Neural Networks: A. Krizhevsky, I. Sutskever, G. Hinton: 2012. The CNN is a technique repeating the following processing. In the first hierarchy, the CNN performs processing for obtaining an image "g", as a convolution calculation result, from an input image "f" according to the following formulae 2 and 3. In the subsequent hierarchy, the CNN repeats similar processing while regarding the image "g" (i.e., the convolution calculation result) obtained in the preceding hierarchy as an input image "f" for the present hierarchy. The CNN repeats the above-mentioned processing.

$$g = \Upsilon(f * w) \quad (2)$$

$$g_{x,y} = \sum_{i=0}^{u} \sum_{j=0}^{v} \gamma(f_{x+i,y+j} w_{i,j}) \quad (3)$$

In the formula (2), "*" represents a convolution arithmetic operator, the formula (3) indicates the details. The "*" in the formula (2) indicates that a convolution kernel "w" having a vertical width "u" and a horizontal width "v" is applied to all "x" and "y" values of coordinates (x, y) of the input image "f". Further, the function γ in the formulae (2) and (3) is a nonlinear activation function, such as sigmoid function or arctangent function. In the present exemplary embodiment, the implicit attribute detection unit 1211 gradually contracts an input face image by repeating the convolution arithmetic operation and finally extracts a one-dimensional value. Then, implicit attribute detection unit 1211 identifies one of two classes to which the input image "f" belongs, similar to the linear classifier.

$$\begin{cases} f \Rightarrow class1 & g > 0 \\ f \Rightarrow class2 & g < 0 \end{cases} \quad (4)$$

Although the number of hierarchies constituting the CNN and the vertical/horizontal widths of the kernel "w" can be manually set, the values of the kernel "w" of each hierarchy can be obtained through machine learning. A practical method employable to obtain the kernel "w" is, for example, a back propagation. The back propagation is characterized by supervised learning processing applied to a neural network. The back propagation includes preparing a pair of a learning target image and a class to which the learning target image belongs (i.e., a correct solution value) beforehand, comparing an output value obtained by inputting the learning target image to the CNN with the correct solution value, and correcting the kernel of the final layer based on a difference between the output value and the correct solution value. Repeating the processing for correction of the kernel by reversely propagating an attenuated difference to a preceding layer is the origin of the name "back propagation". However, the back propagation is disadvantageous in that the propagated difference is so attenuated that the kernel cannot be corrected in a layer adjacent to the input. To overcome such a weakness, there is a recently proposed method for successively completing the learning processing for each hierarchy of the CNN from the input side.

The CNN is highly flexible because the number of parameters to be obtained in the machine learning is large. In this respect, the CNN can be a powerful classifier. However, the requisite amount of learning data increases correspondingly. Therefore, the feature extraction unit 1210 may be configured to include a precursor feature extraction unit 1212 that can partially contract an input image and extract a feature that can identify an individual person. FIG. 7 illustrates an example of a detailed configuration of the feature extraction unit 1210 that includes the precursor feature extraction unit 1212.

The learning unit 1400 may be configured to separately perform machine learning for the precursor feature extraction unit 1212. In this case, the robustness against a visually recognizable variation of an image, which should be assured by the implicit attribute detection unit 1211, decreases. Therefore, it is expected that the obtainable identification accuracy is satisfactory even when the amount of learning data is smaller.

The learning unit 1400 can perform CNN-based machine learning processing for the precursor feature extraction unit 1212, similar to the implicit attribute detection unit 1211. However, the precursor feature extraction unit 1212 may be configured in such a way as to be manually designed by the technique discussed in the thesis of Ahonen et al. Realizing the precursor feature extraction unit 1212 based on the CNN and performing machine learning beforehand is feasible in the following manner. Although the learning unit 1400 has used only a part of persons included in the prepared learning data in the machine learning for the implicit attribute detection unit 1211, the learning unit 1400 uses all of the prepared persons in the machine learning for the precursor feature extraction unit 1212. More specifically, the learning unit 1400 generates all possible pairs of face images of all persons and classifies them into identical person pairs and different person pairs. If two face images are originated from an identical person pair, the learning unit 1400 designs a purpose function in such a manner that quite similar feature quantities can be extracted by the precursor feature extraction unit 1212. Further, if two face images are originated from a different person pair, the learning unit 1400 designs a purpose function in such a manner that apparently different feature quantities can be extracted by the precursor feature extraction unit 1212. Then, the learning unit 1400 trains the precursor feature extraction unit 1212 based on the designed purpose function according to the back propagation.

Through the above-mentioned processing, the learning unit 1400 can train an extended version one-vs-one type classifier.

In the present exemplary embodiment, for the purpose of simplifying the description, the implicit attribute detection unit 1211 has been described in detail based on the classifiers of two classes illustrated in FIGS. 6A, 6B, 6C, and 6D. However, the processing according to the present exemplary embodiment is not limited to the above-mentioned two-class classifiers and is applicable to classifiers of three classes or more.

(Identification Processing: Similarity Calculation)

The similarity calculation unit 1220 will be described in detail below. In the present exemplary embodiment, the similarity calculation unit 1220 can check respective feature quantities of two input images and can calculate a degree of similarity between the compares quantities. An arbitrary similarity calculation method is employable. However, it is desired that the employed method can obtain a degree of similarity directly indicating the resemblance between compared feature quantities. In the present exemplary embodiment, the feature extraction unit 1210 outputs a feature quantity vector, i.e., a single vector obtained by connecting output values obtained from respective implicit attribute detection units 1211 based on respective input images, as an identification result. For example, the similarity calculation unit 1220 may be configured to acquire a cosine value of an angle formed between two vectors of feature quantities obtained based on two input images, as the degree of similarity. Further, the similarity calculation unit 1220 may be configured to acquire a reciprocal of the Euclidean distance between feature quantity vectors of two input images, as the degree of similarity. Further, the similarity calculation unit 1220 may perform processing for machine learning processing for a conventionally known two-class classifier (e.g., Support Vector Machine), as a classifier capable of identifying whether two input images are similar to or different from each other.

<Effects of Present Exemplary Embodiment>

As mentioned above, in the present exemplary embodiment, the object identification apparatus 1000 extends the concept "One" (i.e., one person) of the implicit one-vs-one type attribute detector to two persons or more. More specifically, instead of performing identification processing with a classifier capable of identifying one class (or a specific person) and another class (or another person), the object identification apparatus 1000 performs the following processing. Specifically, the object identification apparatus 1000 performs identification processing with a classifier capable of identifying a class including two or more classes (i.e., a specific person group) and another class including one or more classes (another person group or another person). More specifically, the object identification apparatus 1000 performs processing for identifying input data with a many-to-many or many-to-one classifier, instead of using the one-to-one classifier.

Figure 8A:
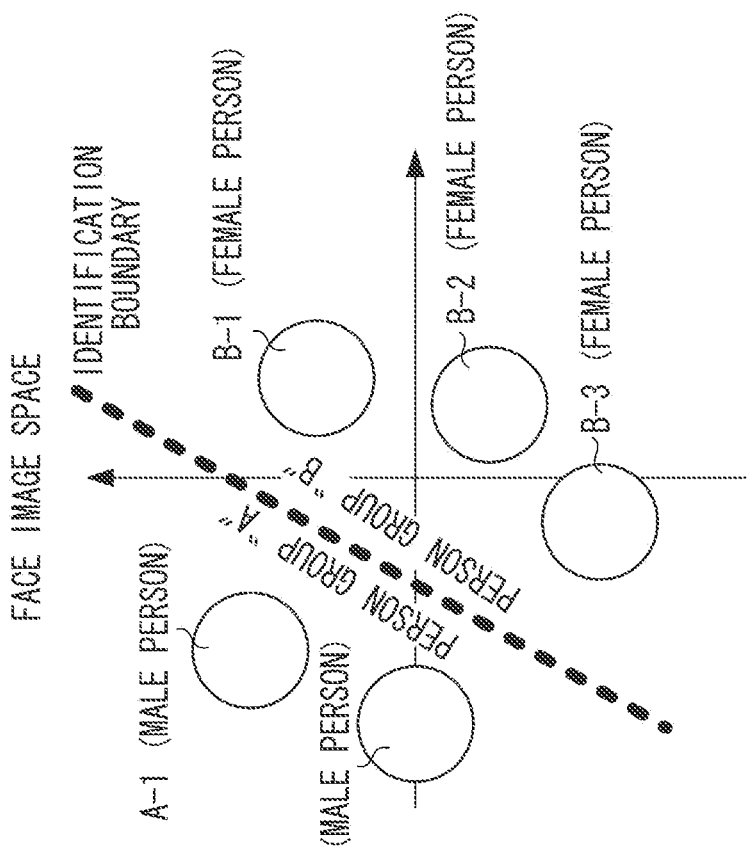
Figure 8B:
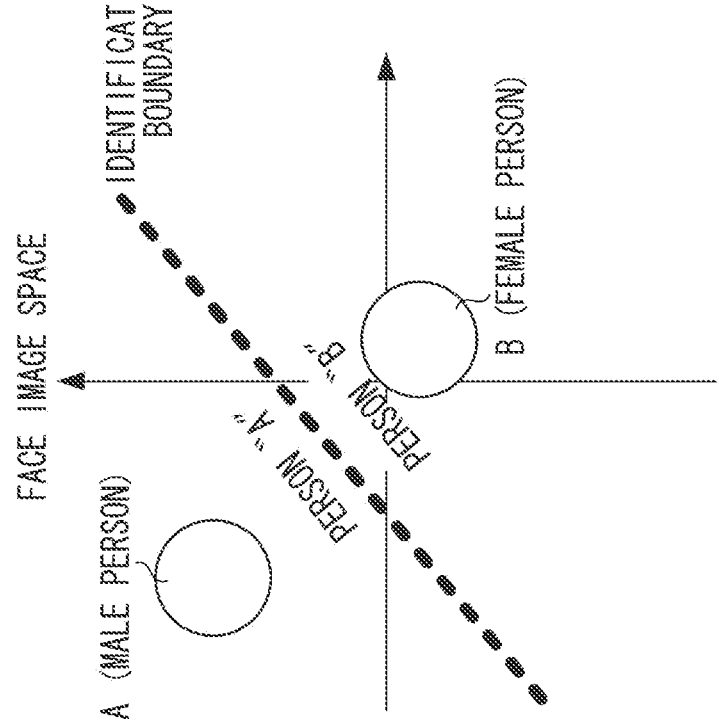

FIGS. 8A, 8B, and 8C illustrate the identification processing to be performed by the implicit attribute detection unit 1211. FIG. 8A illustrates identification processing to be performed by the conventional implicit attribute detection unit (i.e., the one-vs-one type classifier). FIG. 8B illustrates identification processing that can be performed by the implicit attribute detection unit 1211 according to the present exemplary embodiment, which is the improved one-vs-one type classifier characterized by the extended "One". The object identification apparatus 1000 brings the following two effects by performing the identification processing with the above-mentioned implicit attribute detection unit 1211.

As a first effect, the object identification apparatus 1000 can improve the identification accuracy because an increased amount of learning data is usable in the learning of the implicit attribute detection unit 1211. If the used implicit attribute detection unit 1211 is the one-vs-one type classifier, the data available for the object identification apparatus 1000 in the training of the implicit attribute detection unit 1211 is limited to the data of only two specific persons. Therefore, the object identification apparatus 1000 cannot secure a sufficient amount of learning data. Accordingly, the object identification apparatus 1000 cannot sufficiently train the implicit attribute detection unit 1211. However, in the present exemplary embodiment, the object identification apparatus 1000 uses the improved one-vs-one type classifier characterized by the extended "One" as the implicit attribute detection unit 1211. Therefore, in training the implicit attribute detection unit 1211, the object identification apparatus 1000 can use data not relating to the two specific persons. Therefore, the object identification apparatus 1000 can secure a sufficient amount of learning data and can sufficiently train the implicit attribute detection unit 1211. As a result, the accuracy in identifying the class of input data can be improved.

For example, if it is construed that FIG. 8A illustrates a gender detector, an identification boundary capable of identifying a male person "A" and a female person is obtained through machine learning. The detector illustrated in FIG. 8A does not assure the capability of detecting male/female attribute for another person. On the other hand, if a detector is usable in machine learning two person groups each including a plurality of male or female persons as illustrated in FIG. 8B, it will be feasible to create a general-purpose gender detector.

As a second effect, the object identification apparatus 1000 can incorporate numerous implicit attribute detectors because of the use of advanced one-vs-one type classifier characterized by the extended "One". In general, if the learning data includes the data of four persons, the learning unit 1400 generates six pairs each being composed of one person and another person in training the one-vs-one type classifier and performs machine learning processing for six classifiers corresponding to the generated pairs respectively. On the other hand, in the present exemplary embodiment, the learning unit 1400 can generate a total of 28 pairs of person groups and can perform machine learning processing for 28 classifiers corresponding to the generated pairs respectively. For example, if it is assumed that all learning data belonging to the person group "A" are male persons and all learning data belonging to the person group "B" are female persons as illustrated in FIG. 8B, it can be construed that the learning unit 1400 trains the attribute detector capable of implicitly identifying the gender. Further, the learning unit 1400 can train a new attribute detector by changing the division pattern of person groups as illustrated in FIG. 8C even when the used learning data is the same as FIG. 8B. According to the example illustrated in FIG. 8C, all persons belonging to the person group "A" are white skin persons and all persons belonging to the person group "B" are black skin persons. In this case, the attribute detector can be construed to implicitly identify the skin color.

The processing for extending the constraint of the one-vs-one type classifier in performing machine learning processing for the person classifier discussed in the thesis of Berg et al., which is operable as an implicit attribute detector, has been described in the first exemplary embodiment. On the other hand, in a second exemplary embodiment, processing capable of extending the constraint similarly in performing the machine learning processing for the one-vs-rest type attribute detector discussed in the thesis of Kumar et al., which is operable as an implicit attribute detector, will be described in detail below. The one-vs-rest type classifier is capable of identifying whether identification target data belongs to a specific class or another class. In face identification, the one-vs-rest type classifier identifies whether face image data of an identification target represents a specific person or other than the specific person. The one-vs-rest type attribute detector is a classifier that can identify whether input data belongs to a specific class or does not belong to the specific class. The conventional one-vs-rest type attribute detector configured to identify a face of a person identifies whether input data relates to a specific person or other than the specific person. An attribute detector according to the present exemplary embodiment can identify whether input data belongs to a specific person group or belongs to another group, in identifying a face of a person. Features of processing according to the present exemplary embodiment not described in the first exemplary embodiment will be described in detail below.

<Implicit Attribute Detection Processing and Learning Processing>

Figure 9A:
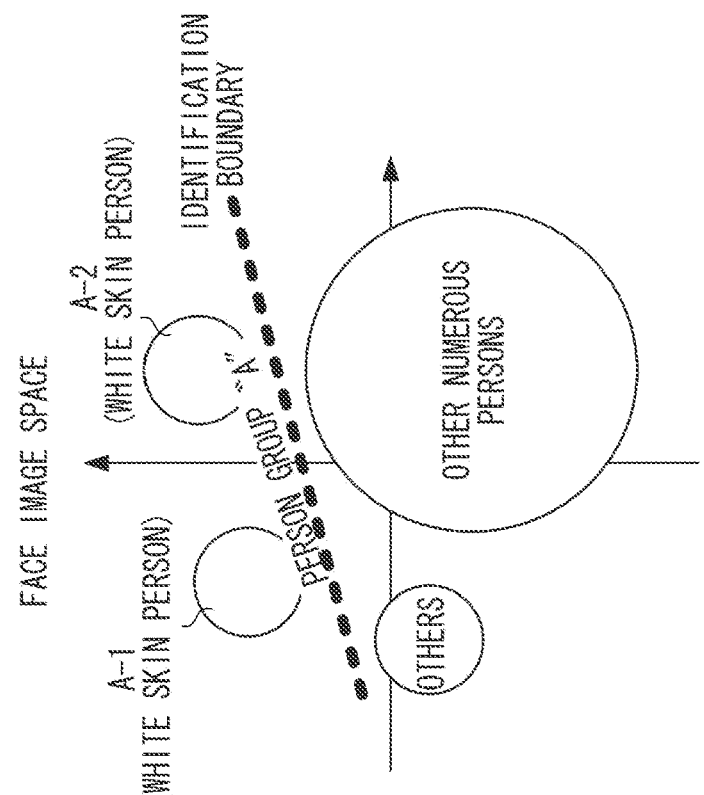
FIGS. 9A and 9B illustrate an example of identification processing performed by the implicit attribute detection unit.
Figure 9B:
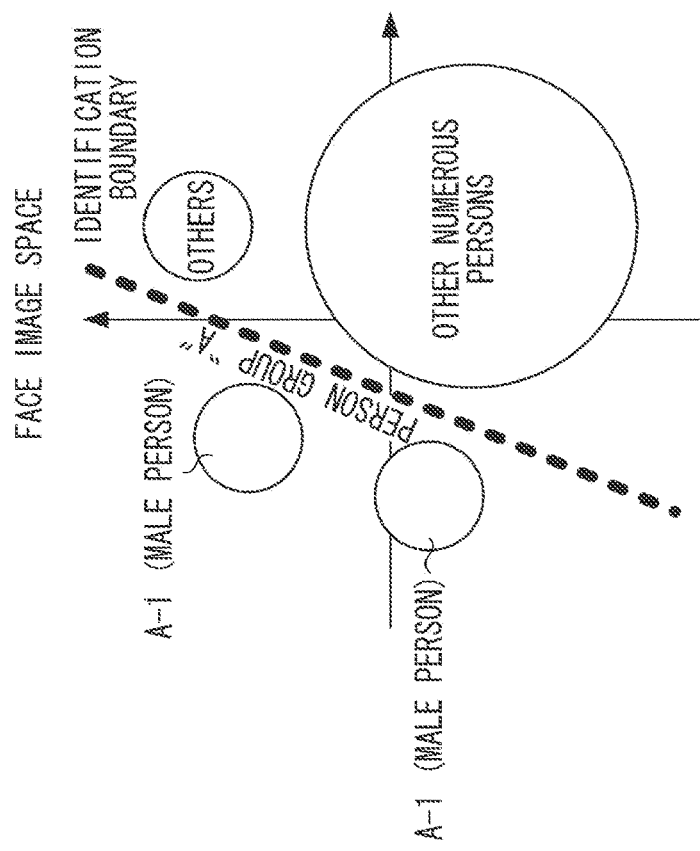

An implicit attribute detection unit 1211 according to the present exemplary embodiment will be described in detail below with reference to FIGS. 9A and 9B. FIGS. 9A and 9B illustrate identification processing to be performed by the implicit attribute detection unit. Similar to that described in the first exemplary embodiment, the implicit attribute detection unit 1211 is a classifier capable of identifying one of two classes to which a face included in an input image belongs. The two-class identification according to the present exemplary embodiment includes identifying whether input data belongs to the person group "A" prepared beforehand or does not belong to the group "A". The implicit attribute detection unit 1211 can be construed in the following manner. For example, as illustrated in FIG. 9A, it is assumed that the learning unit 1400 divides learning data prepared beforehand to obtain the identification boundary into the person group "A" and others, when training the implicit attribute detection unit 1211. It is assumed that all persons belonging to the person group "A" are male and other numerous persons are men and women of various ages. The learning unit 1400 directly learns an identification boundary capable of identifying whether the input image resembles the person group "A" and, at the same time, implicitly learns an identification boundary capable of identifying whether the face included in the input image is male.

On the other hand, FIG. 9B illustrates an example of machine learning processing for determining the identification boundary based on the same learning data illustrated in FIG. 9A, in which the division pattern of the person groups has been changed. The learning unit 1400 divides the learning data into the person group "A" and others according to a method differentiated from that illustrated in FIG. 9A, when training the implicit attribute detection unit 1211. If it is assumed that all persons belonging to the person group "A" are white skin persons, the learning unit 1400 directly learns an identification boundary that identifies whether the input image resembles the person group "A" similar to FIG. 9A and, at the same time, implicitly learns an identification boundary that identifies the skin color.

The implicit attribute detection unit 1211 having been subjected to the above-mentioned learning processing can identify whether the input image includes a male face or whether the skin color of the input image is white.

As described above, through the processing according to the present exemplary embodiment, the object identification apparatus 1000 can train the implicit attribute detector, which is the improved implicit one-vs-rest type attribute detector characterized by the extended "One". Further, the object identification apparatus 1000 can identify the class of input data by using the implicit one-vs-rest type attribute detector whose constraint has been extended.

In the first and the second exemplary embodiments, the plurality of implicit attribute detection units 1211 is configured to perform processing in parallel to each other. On the other hand, in a third exemplary embodiment, a plurality of implicit attribute detection units is hierarchically arranged as described in detail below. Features of processing according to the present exemplary embodiment not described in the first and the second exemplary embodiments will be described in detail below.

<Identification Processing: Feature Extraction>

Figure 10:
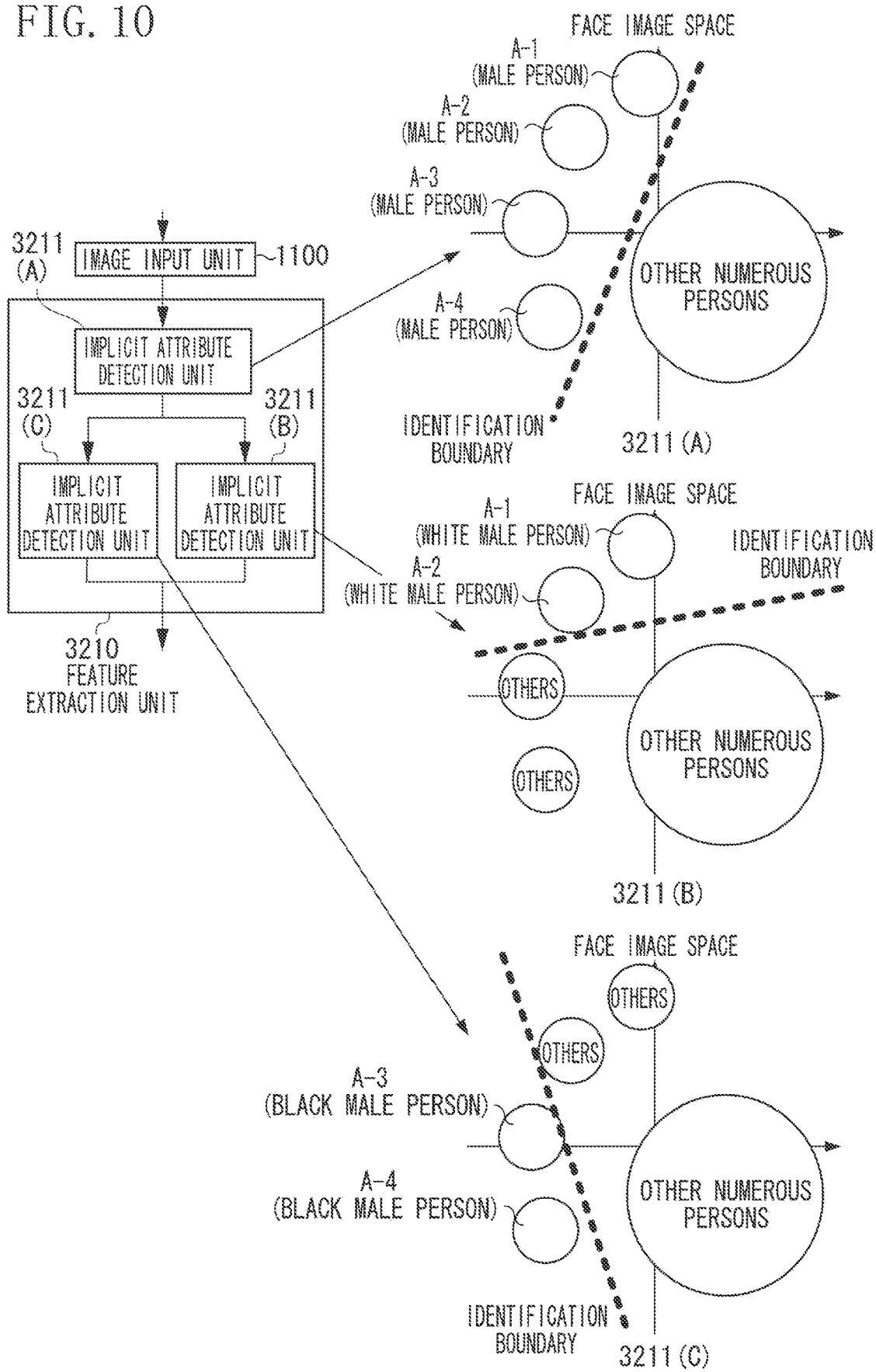
FIG. 10 illustrates an example of a detailed configuration of the feature extraction unit.

FIG. 10 illustrates an example of a detailed configuration of a feature extraction unit 3210. The feature extraction unit 3210 has characteristic features that are different from those of the feature extraction unit 1210 according to the first exemplary embodiment, as described in detail below. The feature extraction unit 3210 includes a plurality of implicit attribute detection units 3211. The feature extraction unit 3210 is configured to include one precedent implicit attribute detection unit 3211 followed by a plurality of implicit attribute detection units 3211. In the present exemplary embodiment, the feature extraction unit 3210 includes three implicit attribute detection units 3211. One precedent implicit attribute detection unit 3211 is connected to two subsequent implicit attribute detection units 3211. The implicit attribute detection units included in the feature extraction unit 3210 are an implicit attribute detection unit 3211A, an implicit attribute detection unit 3211B, and an implicit attribute detection unit 3211C. The implicit attribute detection unit 3211B and the implicit attribute detection unit 3211C are positioned in parallel to each other in such a way as to follow the implicit attribute detection unit 3211A.

<Identification Processing: Implicit Attribute Detection>

The implicit attribute detection unit 3211 will be described in detail below with reference to FIG. 10. For example, it is assumed that the learning unit 1400 has obtained the identification boundary beforehand through machine learning processing for the implicit attribute detection unit 3211A, based on learning data including the person group "A" being composed of four persons. If it is assumed that all persons included in the person group "A" are male and other numerous persons are men and women of various ages, the implicit attribute detection unit 3211A can be construed in the following manner. Specifically, it can be construed that the implicit attribute detection unit 3211A directly identifies whether the input image belongs to the person group "A" and implicitly identifies whether the input image includes a male face.

If the implicit attribute detection unit 3211A determines that the input image belongs to the person group "A", the feature extraction unit 3210 transmits the input image to the subsequent implicit attribute detection units 3211B and 3211C. It is assumed that the person group "A" used when the learning unit 1400 performs machine learning processing for the implicit attribute detection units 3211B and 3211C is a part of the above-mentioned four persons used in the preceding implicit attribute detection unit 3211A. If it is assumed that all persons belonging to the person group "A" used in the machine learning processing for the implicit attribute detection unit 3211B are white skin males, the implicit attribute detection unit 3211B is functionally operable as an attribute detector capable of implicitly identifying whether the input image includes a white skin male face. Similarly, if it is assumed that all persons belonging to the person group "A" used in the machine learning processing for the implicit attribute detection unit 3211C are black skin males, the implicit attribute detection unit 3211C is functionally operable as an attribute detector capable of implicitly identifying whether the input image includes a black skin male face.

The preceding implicit attribute detection unit 3211A identifies whether a person included in the input data is male. Each of the subsequent implicit attribute detection units 3211B and 3211C identifies whether the person included in the input data is a white skin male (or a black skin male). More specifically, the subsequent implicit attribute detection units 3211B and 3211C are functionally operable as detectors capable of implicitly detecting detailed attributes. It is apparent that "white skin male" and "black skin male" are detailed attributes compared to "male" and "female" (i.e., attributes of probability 50%) and are better as features usable in identifying each individual person. Therefore, the accuracy of the face identification can be improved.

The subsequent implicit attribute detection units 3211B and 3211C intend to identify the class of the identified input data, i.e., the group "A" identified by the preceding implicit attribute detection unit 3211A, in detail. Therefore, if the preceding implicit attribute detection unit 3211A identifies that the input data represents a person not included in the group "A", the subsequent implicit attribute detection units 3211B and 3211C perform the following processing. Specifically, the subsequent implicit attribute detection units 3211B and 3211C immediately identify the person not included in the group "A" without actually performing the identification processing on the input data. With this operation, the object identification apparatus 1000 can prevent the subsequent implicit attribute detection units 3211B and 3211C from performing useless identification processing.

Further, in the present exemplary embodiment, the learning unit 1400 generates pairs of person groups to be used in the machine learning processing for the implicit attribute detection unit 3211, according to a method similar to that described in the first exemplary embodiment. For example, in a case where personal data of four persons is used in the machine learning of the preceding implicit attribute detection unit 3211A, a total of 28 pairs of person groups are used in the machine learning of the subsequent implicit attribute detection units 3211B and 3211C. The learning unit 1400 trains the classifiers corresponding to the generated pairs of person groups. The classifiers trained by the learning unit 1400 are expected to implicitly detect a common attribute, if such an attribute is present among the persons belonging to the generated group possess, similar to the first exemplary embodiment.

As mentioned above, in the present exemplary embodiment, the object identification apparatus 1000 uses a plurality of implicit attribute detection units 3211 that are arranged in the hierarchical structure. Therefore, the object identification apparatus 1000 can improve the identification accuracy in object identification, compared to that described in the first exemplary embodiment.

Although the present invention has been described in detail based on the exemplary embodiments, the present invention is not limited to specific exemplary embodiments.

For example, a part or the whole of the above-mentioned functional configuration of the object identification apparatus 1000 can be replaced by a hardware configuration that can be incorporated in the object identification apparatus 1000.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-235022, filed Dec. 1, 2015, which is hereby incorporated by reference herein in its entirety.

What is claimed is:

1. An identification apparatus comprising:
at least one memory; and
one or more processors in communication with the at least one memory, the one or more processors configured to provide:
an acquisition unit configured to acquire input face image data;
a plurality of binary classifiers each of which is configured to classify the input face image data into one of respective two groups of persons, wherein the respective two groups for the plurality of binary classifiers are independent and members of the respective two groups are selected from a set of predetermined persons without specifying their common attributes, and at least one of the two groups of persons for at least one of the plurality of binary classifiers includes two or more persons; and
an identification unit configured to identify a person to which the input face image data belongs based on a combination of groups of persons, where each group in the combination of the groups corresponds to a classification result of the input face image data obtained by respective one of the plurality of binary classifiers.

2. The identification apparatus according to claim 1,
wherein the acquisition unit acquires first input face image data and second input face image data as the input face image data, and
wherein the identification unit identifies classes to which the first input face image data and the second input face image data acquired by the acquisition unit belong,
the identification apparatus further comprising a determination unit configured to determine whether the person of the first input face image data is equal to or different from the person of the second input face image data based on the person of the first input face image data and the person of the second input face image data identified by the identification unit.

3. The identification apparatus according to claim 2,
wherein each of the plurality of classifiers is configured to identify whether the input face image data belongs to a first class or a second class including all data not belonging to the first class, and
wherein the identification unit identifies the classes to which the first input face image data and the second input face image data acquired by the acquisition unit belong based on the plurality of classifiers.

4. The identification apparatus according to claim 1,
wherein the plurality of classifiers are each configured to identify whether the input face image data belongs to a first class or a second class including at least one class having been set beforehand, and
wherein the identification unit identifies the classes to which the first input face image data and the second input face image data acquired by the acquisition unit belong based on the plurality of classifiers.

5. The identification apparatus according to claim 2, wherein the identification unit identifies the classes to which the acquired first input face image data and the second input face image data belong by using the plurality of classifiers that are linear classifiers.

6. The identification apparatus according to claim 2, wherein the identification unit identifies the classes to which the acquired first input face image data and the second input face image data belong by using the plurality of classifiers that include neural networks.

7. The identification apparatus according to claim 2, wherein the identification unit identifies the classes to which the acquired first input face image data and the second input face image data belong based on a first classifier included in the plurality of classifiers, and a second classifier included in the plurality of classifiers identifies an identification result obtained by the first classifier.

8. The identification apparatus according to claim 2, wherein the determination unit determines whether the person of the first input face image data is equal to or different from the person of the second input face image data based on a comparison between a vector obtained by connecting class identification results of the first input face image data respectively identified by the plurality of classifiers and a vector obtained by connecting class identification results of the second input face image data respectively identified by the plurality of classifiers.

9. The identification apparatus according to claim 1,
wherein the acquisition unit acquires image data of a captured human face as the input face image data, and
wherein the identification unit identifies the person to which the acquired input face image data belongs based on the classifier configured to identify one of a plurality of classes, to which the data belongs, that includes classes indicating two or more individual persons having been set beforehand.

10. An information processing method for an identification apparatus, the method comprising:
acquiring input face image data;
using a plurality of binary classifiers each of which is configured to classify the input face image data into one of respective two groups of persons, wherein the respective two groups for the plurality of binary classifiers are independent and members of the respective two groups are selected from a set of predetermined persons without specifying their common attributes, and at least one of the two groups of persons for at least one of the plurality of binary classifiers includes two or more persons; and
identifying a person to which the input face image data belongs based on a combination of groups of persons, where each group in the combination of the groups corresponds to a classification result of the input face image data obtained by respective one of the plurality of binary classifiers.

11. A non-transitory computer-readable storage medium storing a program that causes a computer to execute an information processing method for an identification apparatus, the method comprising:
acquiring input face image data;
using a plurality of binary classifiers each of which is configured to classify the input face image data into one of respective two groups of persons, wherein the respective two groups for the plurality of binary classifiers are independent and members of the respective two groups are selected from a set of predetermined persons without specifying their common attributes, and at least one of the two groups of persons for at least one of the plurality of binary classifiers includes two or more persons; and
identifying a person to which the input face image data belongs based on a combination of groups of persons, where each group in the combination of the groups corresponds to a classification result of the input face image data obtained by respective one of the plurality of binary classifiers.

* * * * *